United States Patent
Ferianz (10) Patent No.: US 7,330,063 B2
(45) Date of Patent: Feb. 12, 2008

(54) CIRCUIT ARRANGEMENT FOR LIMITING A RINGING CURRENT

(75) Inventor: Thomas Ferianz, Bodensdorf (DE)

(73) Assignee: Infineon Technologies AG, Munich (DE)

( * ) Notice: Subject to any disclaimer, the term of this patent is extended or adjusted under 35 U.S.C. 154(b) by 184 days.

(21) Appl. No.: 11/336,108

(22) Filed: Jan. 20, 2006

(65) Prior Publication Data

US 2006/0164777 A1  Jul. 27, 2006

(30) Foreign Application Priority Data

Jan. 24, 2005  (DE)  ..................... 10 2005 003 258

(51) Int. Cl.
*H03L 5/00* (2006.01)
(52) U.S. Cl. ..................... 327/309; 327/310; 361/93.9
(58) Field of Classification Search ................ 327/309, 327/310
See application file for complete search history.

(56) References Cited

U.S. PATENT DOCUMENTS

| | | | | |
|---|---|---|---|---|
| 3,656,025 A | * | 4/1972 | Roveti | 361/58 |
| 4,021,617 A | * | 5/1977 | Jones et al. | 379/179 |
| 4,533,970 A | * | 8/1985 | Brown | 361/58 |
| 5,337,208 A | * | 8/1994 | Hossner | 361/93.7 |
| 5,729,418 A | * | 3/1998 | Lei | 361/58 |
| 2002/0097545 A1 | * | 7/2002 | Wood | 361/93.9 |

FOREIGN PATENT DOCUMENTS

| WO | WO 95/33295 | 12/1995 |
|---|---|---|
| WO | WO 02/15539 | 2/2002 |

OTHER PUBLICATIONS

German Office Action dated Sep. 5, 2005.

* cited by examiner

*Primary Examiner*—Kenneth B. Wells
*Assistant Examiner*—Ryan C. Jager
(74) *Attorney, Agent, or Firm*—Jenkins, Wilson, Taylor & Hunt, P.A.

(57) ABSTRACT

A circuit arrangement for bidirectional current limiting comprises a first transistor, a second transistor, a first resistor, a first zener diode and a second zener diode. The first transistor comprises a first controllable path and a first control terminal and the second transistor comprises a second controllable path and a second control terminal. The first and the second control terminals are connected to a first current source and the first resistor is connected between the first and the second controllable paths. The first zener diode is connected between the first current source and a first line node which is located between the first controllable path of the first transistor and the first resistor. The second zener diode is connected between the first current source and a second line node which is located between the second controllable path of the second transistor and the first resistor. The first and second controllable paths and the first resistor are connected between first and second terminals of the circuit arrangement.

20 Claims, 5 Drawing Sheets

CIRCUIT ARRANGEMENT FOR LIMITING A RINGING CURRENT

BACKGROUND OF THE INVENTION

1. Field of the invention

The present invention relates to a circuit arrangement for bidirectional current limiting, in particular of ringing currents in conductor loops for telephone devices. The invention is advantageously applied in switching centre devices for telecommunication networks.

2. Description of the Prior Art

Ringing signals on two-wire lines indicate to connected subscriber devices a call or connection request and leads to the ringing of the dialled telephone or of the terminating subscriber device. In present-day modern telecommunication networks, the two-wire lines originally utilized for telephone traffic are used in parallel in high frequency ranges for digital data transport. High ringing currents on the corresponding two-wire line can then have a disturbing effect on the data traffic.

Figure 5:
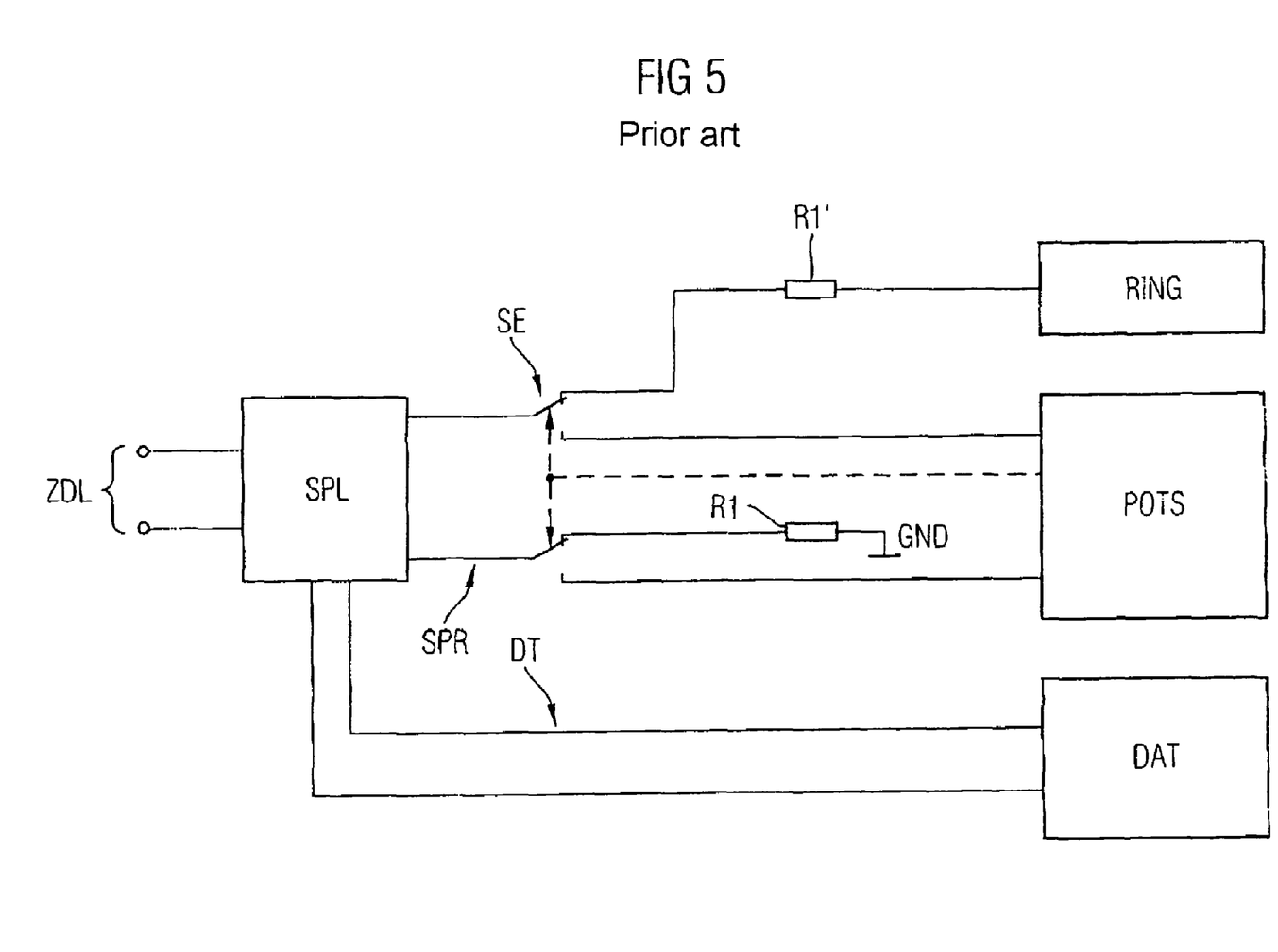
FIG. 5 as discussed above, is a telecommunication system according to the prior art.

FIG. 5 shows a customary telecommunication network, used for telephone applications and also modern data transfer, at the switching centre end. In this case, provision is made of a telephone system POTS for voice communication on a two-wire line ZDL and a data system DAT for the broadband transmission of data via the two-wire line ZDL.

Both systems POTS, DAT are coupled to a splitter device SPL, which essentially feeds low-frequency signals SPR to the telephone system POTS and high-frequency data signals DT to the data system DAT. The splitter device SPL is generally embodied as a high-order filter comprising a plurality of inductors connected in series. A relatively large design is required inter alia because ringing signals which are transmitted via the two-wire line to the subscriber terminal equipment often cause large currents.

For ringing signal generation, a ringing signal generator RING is provided, which can be connected to the two-wire line ZDL via a switching device SE controlled by the telephone system POTS by means of control signals CTR. A ringing current then flows from the ringing signal generator RING via a first resistor R1', the two-wire conductor loop ZDL or the splitter device SPL and via a second resistor R1 to earth GND. High ringing currents of above 100 mA may occur in particular when an off-hook identification is carried out. The inductors established in the splitter device SPL then rapidly achieve saturation and often cause data errors during the data communication that takes place in parallel via the two-wire line ZDL, the splitter SPL and the data system DAT.

In order to attenuate the disturbing influence of ringing currents, the prior art makes use of large designs of the inductors or of the splitter device SPL in order to avoid core saturations. Higher-order filters are generally expensive and complicated. This leads to increased costs and additionally requires matching of the splitter impedances to the voice impedances used in a respective country.

SUMMARY OF THE INVENTION

It is an object of the present invention to provide a device which makes it possible to use simple designs of splitter devices and to minimize a negative influence of ringing currents on the data transmission.

The object is achieved in accordance with the invention by means of a circuit arrangement for bidirectional current limiting having a first and a second transistor each having a controllable path and a control terminal, a resistor being connected between the controllable paths and the control terminals being connected to a current source. A first zener diode is provided, which is connected between the current source and a first line node between the controllable path of the first transistor and the resistor. A second zener diode is connected between the current source and a second line node between the controllable path of the second transistor and the resistor. In this case, the controllable paths and the resistor are connected between a first terminal and a second terminal of the circuit arrangement for current limiting.

The inventive circuit arrangement can be used simply instead of one of the resistors that are used according to the prior art. A ringing current generated by a ringing signal generator, for example, is then automatically limited to a limiter current dependent on the dimensioning of the zener diodes, transistors and resistors. As a result, splitter devices for splitting into data traffic and telephone traffic can be embodied favourably in terms of complexity and in a manner that saves costs. The invention furthermore has the advantage that a current limiting is effected symmetrically, that is to say in both current directions through the circuit arrangement, and that the circuit outlay is very low by virtue of the small number of functional components.

In a restricted version of the inventive arrangement, a further complementary current source is furthermore provided, which is connected to the first line node and the second line node, in order to compensate for a current generated by the first current source in the current path between the first terminal and second terminal of the circuit arrangement. This results in a particularly reliable and accurate regulation of the limited current in the current path.

At least one of the current sources may have a control voltage terminal and a further resistor.

The two zener diodes may be connected in such a way that a constant control voltage is present at the two control terminals if no current flows between the first terminal and the second terminal of the circuit arrangement.

The constant control voltage may be defined, for example, by the breakdown voltage of the zener diodes such that the controllable paths of the transistors then provide an electrical connection between the two terminals of the circuit arrangement.

Preferably, at least one of the current sources may be embodied in switchable fashion. As a result, the controllable paths of the transistors can be operated as switches, or if, in the switched-off state of the current sources, no current flows away via the zener diodes, the controllable paths are non-conducting.

The zener diodes have a breakdown voltage, the resistor has a resistance and the transistors have a threshold voltage. Preferably the breakdown voltage, the resistance and the threshold voltage may be chosen in such a way that in the event of a rise in the current through the current path between the first terminal and second terminal of the circuit arrangement, starting from a limiting current value, one of the controllable paths effects blocking. If one of the zener diodes effects blocking as a result of the preferably chosen dimensioning of the threshold voltage, the resistance and the breakdown voltage, a current can flow from the current source to one of the two terminals only through the respective second non-blocking zener diode. In this case, a current will then flow via the resistor or a voltage will then be dropped across said resistor until the control potentials at the control terminals of the transistors do not suffice to activate the controllable paths. Consequently, the current through the current path between the two terminals of the circuit arrangement is then restricted or limited.

A capacitor may be connected in parallel between the control terminal and the controllable path of at least one of the transistors. Since the zener diodes used may constitute noise sources, the use of capacitors results in an improved noise behaviour.

A noise suppression resistor may be interposed between the control terminal of at least one of the transistors and the current source. Together with a capacitance that is always present between the control terminal and the respective adjacent line node, such a noise suppression resistor forms a low-pass filter, which likewise improves the noise properties. If capacitors and noise suppression resistors are provided, a particularly good low-pass filter is formed for noise suppression.

Preferably, a turn-off resistor may be connected between the current source and the first and/or second line node. By virtue of the turn-off resistor, it is possible to obtain a particularly rapid flowing away of charge from the capacitors or the capacitance between control terminal and controllable path of the transistors if a ringing signal is decoupled, or if no current flow flows between the first and second line nodes.

In a further restricted version of the inventive circuit arrangement, a first regulating transistor having a controllable path and a control terminal is provided, the controllable path of the first regulating transistor being connected between the control terminal of the first transistor and the second line node and the control terminal of the regulating transistor being connected to the first line node.

A second regulating transistor having a controllable path and a control terminal may be provided, the controllable path of the second regulating transistor being connected between the control terminal of the second transistor and the first line node and the control terminal of the second regulating transistor being connected to the second line node. The use of these advantageous regulating transistors makes it possible for the first resistor to be embodied with particularly low resistance, as a result of which a power loss of the current limiting circuit is minimized. An accordingly low-resistance embodiment of the first resistor means that a particularly small voltage drop is generated across this first resistor and the regulating transistors perform the operating point settings of the transistors.

At least one of the transistors may preferably be embodied as a MOSFET, and particularly preferably as an N-channel transistor. Since N-channel transistors are simpler to produce than P-channel transistors, the circuit arrangement also becomes particularly cost-effective.

Preferably, the inventive circuit arrangement may be connected into a line loop for limiting a ringing current. It is furthermore advantageous if the first terminal of the circuit arrangement is coupled to a load and the second terminal of the circuit arrangement is coupled to a supply voltage potential, the load being coupled in turn to a ringing signal generator via a resistor. This use according to the invention of the circuit arrangement makes it possible to transmit even sensitive, high-frequency data signals particularly reliably via the same line loop.

The load then have a splitter device. This splitter device may be embodied particularly simply by means of the current limiting according to the invention and enables a reliable and cost-effective stable data transmission via the line loop.

DESCRIPTION OF THE PREFERRED EMBODIMENTS

In the drawings, unless specified otherwise, identically or functionally identical elements have been provided with the same reference symbols.

Figure 1:
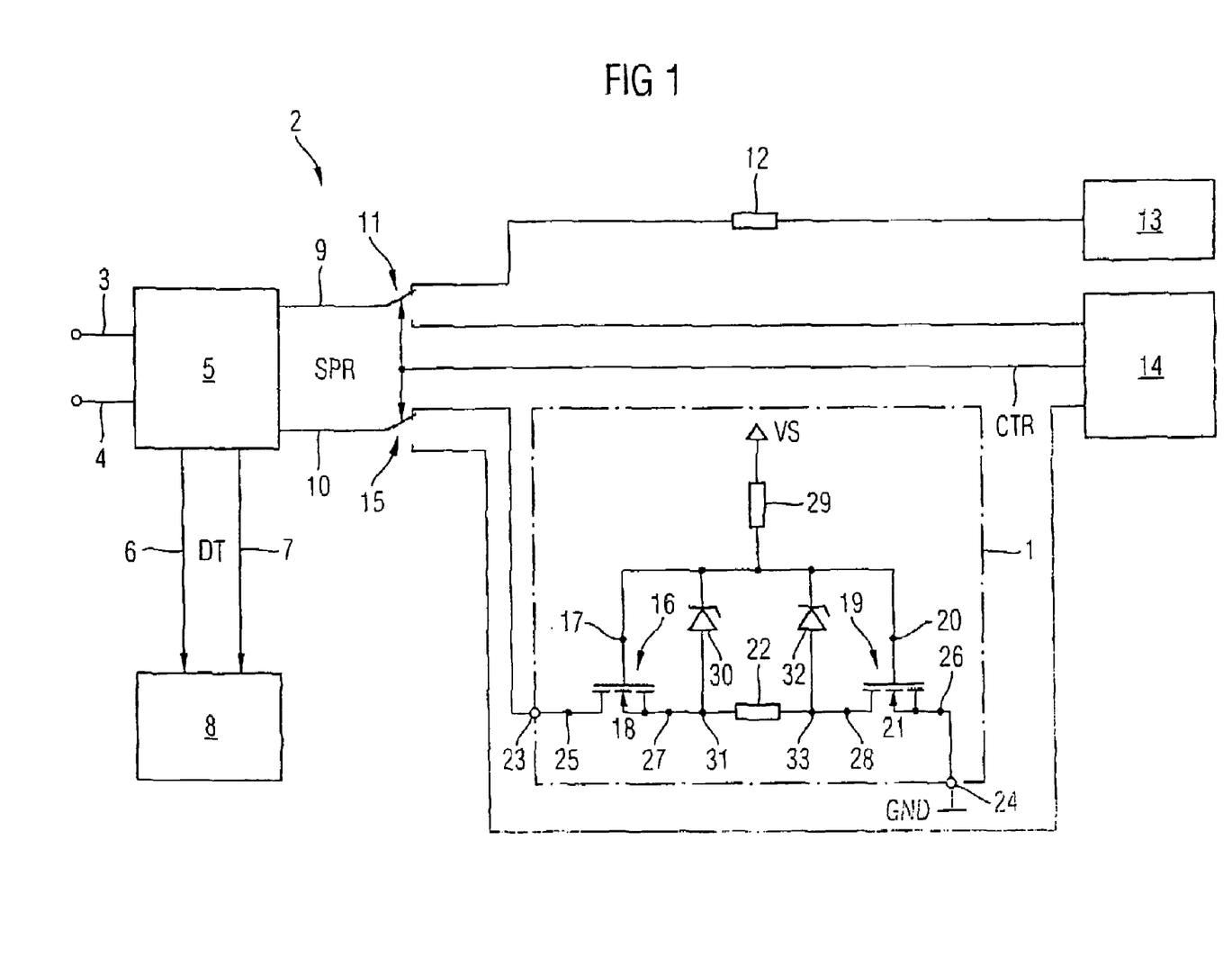
FIG. 1 is a first exemplary embodiment of an inventive circuit arrangement in a telecommunication system.

FIG. 1 illustrates a current limiting 1 according to the invention in a telecommunication system 2.

A two-wire line 3, 4 is provided, which is split by a splitter device 5 into a line pair 6, 7 for high-frequency data signals DT, which are fed to a data system 8. The splitter device 5 furthermore supplies a second two-wire line 9, 10 for the transmission of low-frequency voice signals SPR. The first line 9 of the line loop is connected to a ringing signal generator 13 via a switch 11 and a resistor 12. By means of the switch 11, the first line 9 can also be connected to a telephone system 14. By means of a second controllable switch 15, the second line 10 can likewise be connected to the telephone system 14 or, via the limiter circuit 1 according to the invention, to earth GND. The two controllable switches 11, 15 can be switched synchronously by means of control signals CTR supplied by the telephone system 14. Consequently, in the case of a ringing signal to be fed in, a ringing signal and an associated current are supplied by the ringing signal generator 13 and flow via the resistor 12, the conductor loop 9, 10 via the splitter device 5 into the two-wire line 3, 4 and the limiter circuit 1.

The limiter circuit 1 according to the invention has a first transistor 16 having a control terminal or gate terminal 17 and a controllable path 18 or a source-drain path. The limiter circuit 1 furthermore has a second transistor 19, which second transistor is likewise embodied as a MOSFET in this example, having a gate terminal 20 and a source-drain path 21.

The source-drain paths 18, 21 and a first resistor 22 are connected in series between a first and a second terminal 23, 24 of the limiter circuit 1. In this case, the drain terminal 24 of the first transistor 16 is connected to the first terminal 23 and the drain terminal 26 of the second transistor 19 is connected to the second terminal 24. The first resistor 22 is connected between the source terminal 27 of the first transistor 16 and the source terminal 28 of the second transistor 19.

A current source comprising a control voltage terminal VS and a further resistor 29 is provided, the two gate terminals 17, 20 of the transistors 16, 19 being connected to the further resistor 29. A first zener diode 30 is connected between the further resistor 29 and a first line node 31 situated between the source terminal 27 of the first transistor 16 and the first resistor 22. A second zener diode 32 is connected between the further resistor 29 and a second line node 33 situated between the first resistor 22 and the source terminal 28 of the second transistor 19.

If a ringing signal is then coupled into the conductor loop 9, 10, 3, 4 via the controllable switches 11, 15, the current in the current path between the first terminal 23 and the second terminal 24 of the limiter circuit 1 is limited to a limiting current IB. In this case, the limiting current IB is essentially determined by the resistance R22 of the first resistor 22, the breakdown voltage UZD of the two zener diodes 30, 32 and the threshold voltage UTH of the two transistors 17, 19.

The functioning of the limiting circuit 1 shall be explained below on the basis of typical resistance, breakdown voltage and threshold voltage values. By way of example, it is possible to choose the breakdown voltages UZD=18 volts, the control voltage VS=20 volts, the further resistor 29 with R29=100 KΩ, the first resistor 22 with R22=165 Ω and the two transistors 16, 19 as BSB297 type. The threshold voltage of this transistor type is approximately UTH=1.4 volts, and in the on state the resistance of the drain-source path or of the controllable path is approximately 1 Ω.

In the quiescent state, that is to say if no ringing signal has been coupled into the conductor loop 9, 5, 3, 4, 10, approximately two volts are dropped across the further resistor 29 and the two zener diodes 30, 32 are switched such that in each case a current flows between the current source or the resistor 29 and the first and second line nodes 31, 33 with an order of magnitude such that a control voltage of 18 volts is present at the gate terminals 17, 20. Consequently, the two controllable paths 18, 21 of the transistors 16, 19 are activated.

If a ringing signal having a positive voltage with respect to the first terminal 23 of the limiter circuit 1, is then coupled into the line loop 9, 3, 4, 10, firstly a small current flows via the first controllable path 8, the resistor 22 and the second controllable path 28 to the second terminal 24 connected to earth GND. In this case, a voltage is dropped at the first line node 31 with respect to earth GND at the controllable path 21 and the 165 Ω resistor 22. As soon as the potential dropped at the first line node 31 is higher than at the second line node 33 in the event of a rising current through the path between the first terminal 23 and the second terminal 24, the first zener diode 30 blocks the current flow between the further resistor 29 and the first line node 31 because the voltage present across the first zener diode 30 falls below the zener voltage thereof of 18 volts.

If the current through the path between the first terminal 23 and the second terminal 24 rises further, there will finally be present at the first line node 31 a voltage which differs only little from that at the gate terminal 17 of the first transistor 16, that is to say that the threshold voltage UTH between the source terminal 27 and the gate terminal 17 of the first transistor 16 is undershot. The controllable path 18 then acquires high resistance and restricts the current in the current path.

The limiter circuit thus restricts the current to a limiting current of IB=(UZD−UTH)/R22.

In order to obtain the current limiting according to the invention in the exemplary case chosen here, the control voltage VS must be greater than the zener voltage UZD of the two identical zener diodes 30, 32.

If the ringing signal couples in a negative voltage with respect to earth GND at the first terminal 23 of the limiter circuit 1, the limiting takes place essentially symmetrically, that is to say that the second zener diode 32 firstly effects blocking, so that, in the event of a rising current in the direction of the first terminal 23, a situation is then attained in which the gate-source voltage of the second transistor 19, that is to say the voltage present between the second line node 33 and the gate terminal 20 of the second transistor 19, no longer suffices to activate the controllable path 21. Then, too, the current is restricted and a current limiting is achieved.

Figure 2:
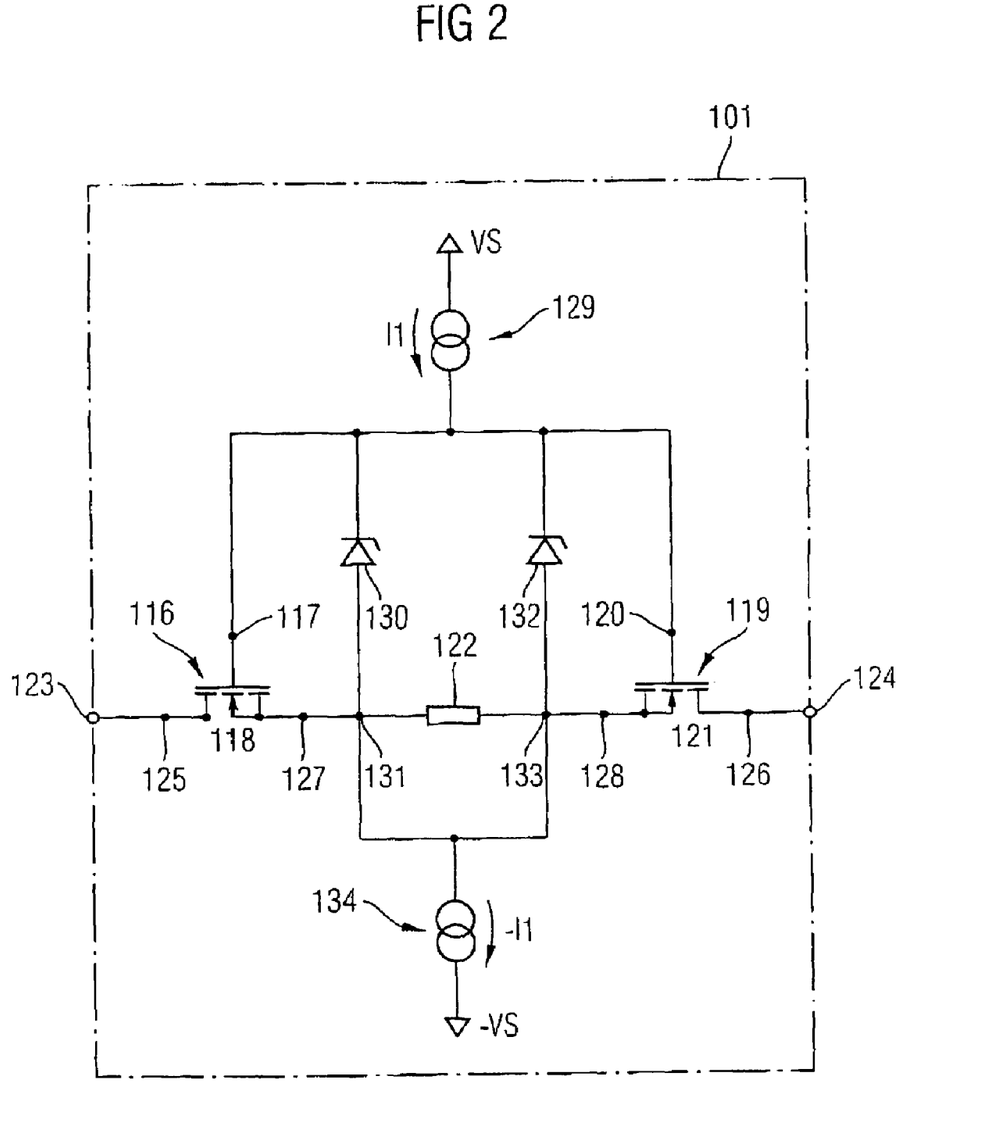
FIG. 2 is a second exemplary embodiment of an inventive circuit arrangement.

FIG. 2 shows an alternative embodiment 101 of the circuit arrangement according to the invention for current limiting.

In comparison with the embodiment according to FIG. 1, the second exemplary embodiment of the limiter circuit 101 essentially differs by virtue of the realization of the current source, which is illustrated here explicitly as current source 129. Furthermore, a complementary current source 134 is connected to the first line node 131 and the second line node 133 and compensates for such currents which arise as a result of the regulating operation in the current path between the first terminal 123 and the second terminal 124 of the limiter circuit 101. The interconnection of the first transistor 116, with its gate terminal 117, drain terminal 125 and source terminal 127, the resistor 122, the second transistor 119 with its gate terminal 120, source terminal 128 and drain terminal 126, and the two zener diodes 130, 132 is effected analogously to FIG. 1.

The embodiment in accordance with FIG. 2 is distinguished by improved regulating properties of the limiting current since additionally generated current is again compensated for by the complementary current source 134.

Figure 3:
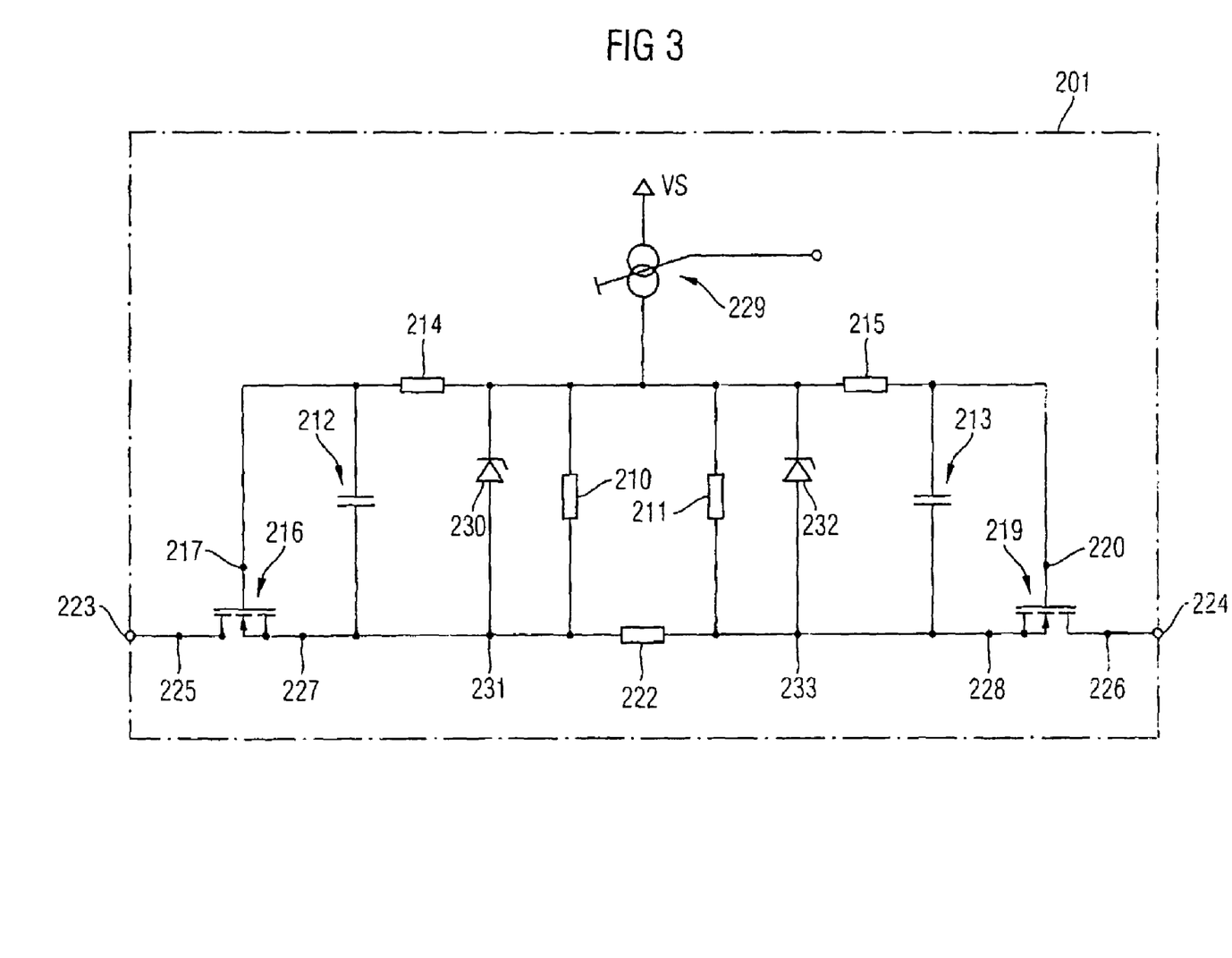
FIG. 3 is a third exemplary embodiment of an inventive circuit arrangement.

FIG. 3 shows a development of the limiter circuit 201 according to the invention.

The limiter circuit 201 has a first terminal 223 and a second terminal 224. A first transistor 216—embodied here as a MOSFET—having a gate terminal 217, a drain terminal 225 and a source terminal 227 and a second transistor 219 having a gate terminal 220, a source terminal 228 and a drain terminal 226 are provided. The drain terminal 225 of the first transistor 216 is connected to the first terminal 223. The source terminal 227 is connected to a first resistor 222, which is in turn connected to the source terminal 228 of the second transistor 219. The drain terminal 226 of the second transistor 219 is connected to the second terminal 224 of the limiter circuit 201. A line node 231 is provided between the source terminal 227 of the first transistor 216 and the resistor 222, and a second line node 233 is provided between the resistor 222 and the source terminal 228 of the second transistor 219.

The limiter circuit 201 has a switchable current source 229 connected to a supply voltage potential VS.

A first zener diode 230 and a first turn-off resistor 210 are connected in parallel between the controllable current source 229 and the first line node 231. A second zener diode 232 and a second turn-off resistor 211 are connected in parallel between the controllable current source 229 and the second line node 233.

The gate terminal 217 of the first transistor 216 is connected to the controllable current source 229 via a first noise suppression resistor 214. Furthermore, the gate terminal 217 of the first transistor 216 is connected to the first line node 231 via a first capacitor 212.

The gate terminal 220 of the second transistor 219 is connected to the current source 229 via a second noise suppression resistor 215. Furthermore, the gate terminal 220 of the second transistor 219 is connected to the second line node 233 via a second capacitor 213.

In comparison with the simple first embodiment of the limiter circuit according to FIG. 1, the development 201 has a switchable current source 229. This has the advantage that, by means of turning off the current source 229, no more control potentials are dropped at the two gate terminals 217, 220 of the transistors 216, 219 and the latter block their respective drain-source paths. As a result, it is possible to prevent any current flow between the first terminal 223 and the second terminal 224.

Moreover, the noise behaviour of the limiter circuit is improved by the use of the two noise suppression resistors 214, 215. Together with the existing gate-source capacitances of the two transistors 216, 219, the noise suppression resistors 214, 215 respectively form a low-pass filter which filters out disturbing higher-frequency noise that may be caused by the zener diodes 230, 232. The filter effect is additionally improved by the two capacitors 212, 213 being inserted.

In order to achieve a fast switching behaviour of the limiter circuit 201, the turn-off resistors 210, 211 are furthermore provided, via which an accumulated charge in the capacitors 212, 213 or the gate-source capacitances of the transistors 216, 219 can respectively flow away. This is important if the controllable current source 229 is turned off and the intention is to effect rapid blocking of the source-drain paths in the current path between the first terminal 223 and the second terminal 224. In principle, this can also be achieved with only one turn-off resistor. The two turn-off resistors 210, 211 are provided for symmetry reasons in this development.

Figure 4:
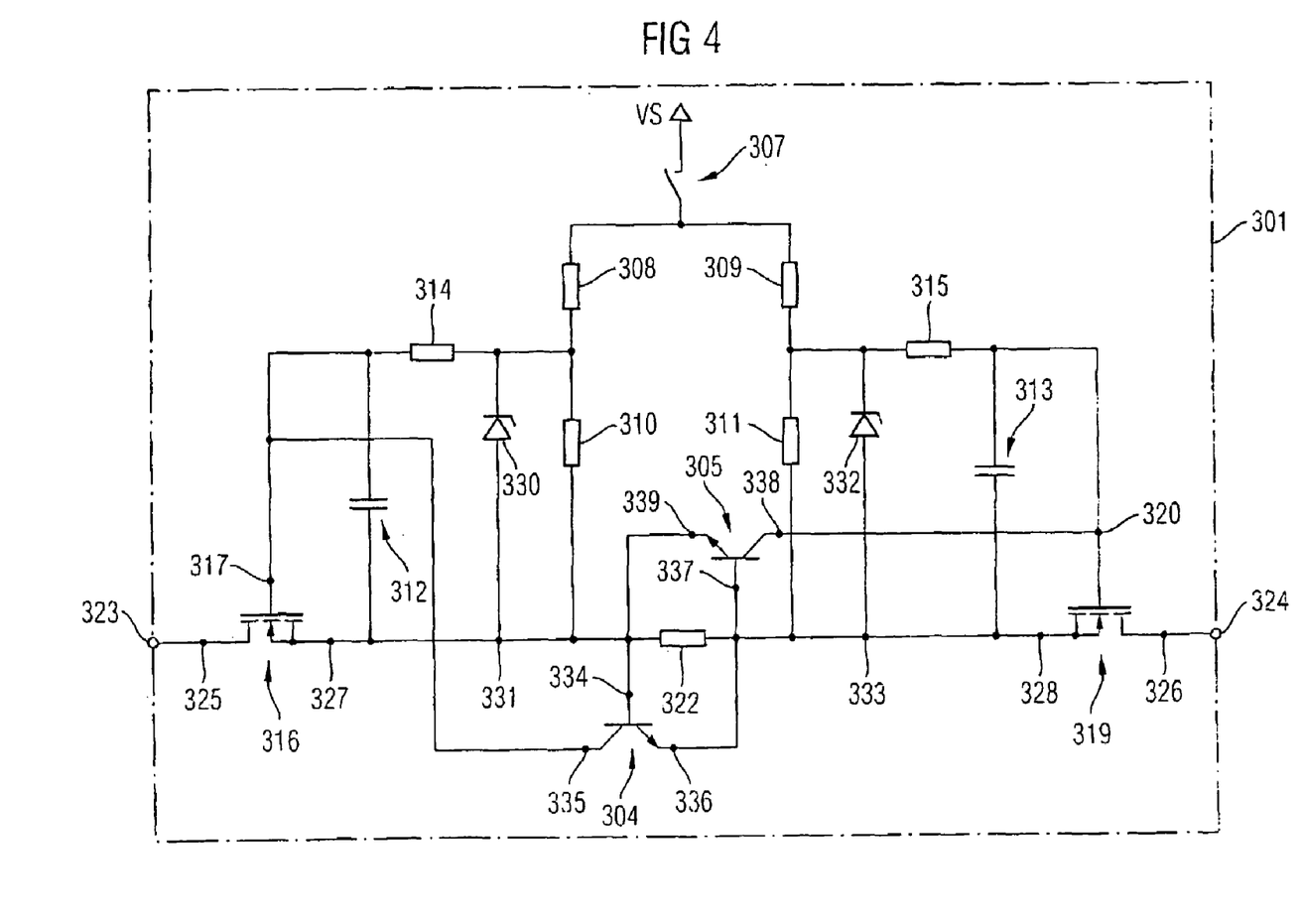
FIG. 4 is a fourth exemplary embodiment of an inventive circuit arrangement.

FIG. 4 shows a particularly preferred development of the limiter circuit 201 according to the invention.

The interconnection of the components essentially corresponds to that in the embodiment according to FIG. 3. Accordingly, a first transistor 316 having a gate terminal 317, a drain terminal 325 and a source terminal 327, a second transistor 319 having a gate terminal 320, a source terminal 328 and a drain terminal 326 are also provided, as are a first terminal 323 and a second terminal 324 of the limiter circuit 301. A first zener diode 330, a second zener diode 332, a first capacitor 312, a second capacitor 313, a first and second noise suppression resistor 314, 315, a first and second turned-off resistor 310, 311 and a resistor 322 are provided. A first line node 332 is provided between the resistor 322 and the source terminal 327 of the first transistor 316, and a second line node 333 is provided between the resistor 322 and the source terminal 328 of the second transistor 319. The switchable current source is realized as supply voltage potential VS and a first current source resistor 308 and a second current source resistor 309 and also a switch 307. The regulating current is coupled in particular into the zener diodes 330 and 332 respectively via the two current source resistors 308, 309.

A first regulating transistor 304 is additionally provided, which in this case is embodied as an NPN bipolar transistor having a base terminal 334, a collector terminal 335 and an emitter terminal 336. In this case, the base terminal 334 serves as control terminal and the collector-emitter path serves as controllable path. The collector terminal 335 is connected to the gate terminal 317 of the first transistor 316.

A second regulating transistor 305 is provided, which is likewise embodied as an NPN transistor and has a base terminal 337, a collector terminal 338 and an emitter terminal 339. The base terminal 337 of the second regulating transistor 305 is connected to the emitter terminal 336 of the first regulating transistor 304. The emitter terminal 339 of the second regulating transistor 305 is connected to the base terminal 334 of the first regulating transistor 304. The collector terminal 338 of the second regulating transistor 305 is connected to the gate terminal 320 of the second transistor 319. Furthermore, the base terminal 334 of the first regulating transistor 304 and the emitter terminal 339 of the second regulating transistor 305 are connected to the first line node 331. The emitter terminal 336 of the first regulating transistor and the base terminal 337 of the second regulating transistor 305 are also connected to the second line node 333.

By virtue of the regulating transistors connected according to the invention, it is possible for the resistor 322 to be designed to be considerably smaller than in the exemplary embodiments in the previous figures. The resistor 22, 122, 222 in the circuits in accordance with the figures essentially serves for putting the transistors 16, 19, 116, 119, 216, 219 into a current-blocking state since the voltage swing as a result of the voltage dropped at the resistor 322 at the zener diodes 330, 332 no longer reaches the respective breakdown voltage UZD.

In the preferred development according to FIG. 4 of the limiter circuit 301, a voltage dropped across the resistor 322 is used, then, for switching the two regulating transistors 304, 305. This necessitates a lower base-emitter voltage than a voltage at the first or second line node 331, 333, which puts the respective zener diode 330, 332 into the blocking state.

In this advantageous development, a regulating voltage for the base terminals 334, 337 of the regulating transistors is dropped at the resistor 322 in the event of a rising current through the path between the first terminal 323 and the second terminal 324. Depending on the current direction in the limiting path, by way of example, a current flows from the voltage source VS via the closed switch 307, the current source resistor 308, the noise suppression resistor 314 and the controllable path or the emitter-collector path of the first transistor 304. As a result, the voltage at the gate terminal 317 of the first transistor 316 falls in such a way that the latter blocks or restricts its source-drain path and brings about a current limiting. In the opposite limiting current direction, the restriction is effected via the switch 307, the second current source resistor 309, the second noise suppression resistor 315 and the emitter-collector path of the second regulating transistor 305. Consequently, the resistor 322 can be formed with low resistance and leads to a lower power loss than in the previous exemplary embodiments. Moreover, a second resistor which is connected directly to a corresponding ringing signal generator a coupling ringing signal is likewise embodied with lower resistance.

All the embodiments of the limiter circuit according to the invention have a series of advantages over the prior art. By virtue of the symmetrical current limiting, splitter devices in corresponding telecommunication systems can be made considerably smaller, as a result of which current and costs are saved. A power loss is considerably improved by virtue of the smaller dimensioning of coupling-in resistors (see R1', R1 in FIG. 5). The circuit arrangements according to the invention are also suitable for switching currents into the line loop, operate very precisely and create a rapid current limiting during operation.

Although the limiter circuit was coupled by way of example to the earth terminal GND, a use is equally possible instead of the first coupling-in resistor R1'. The corresponding regulating voltages and dimensioning of the components can then be adapted in a simple manner.

Although modifications and changes may be suggested by those skilled in the art, it is the intention of the inventor to embody within the patent warranted heron all changes and modifications as reasonably and properly come within the scope of his contribution to the art.

I claim as my invention:

1. A circuit arrangement for bidirectional current limiting, comprising:

a first transistor having a first controllable path and a first control terminal;

a second transistor having a second controllable path and a second control terminal; said first and said second control terminals being connected to a first current source;

a first resistor connected between said first and said second controllable paths;

a first zener diode connected between said first current source and a first line node which is located between said first controllable path of said first transistor and said first resistor;

a second zener diode connected between said first current source and a second line node which is located between said second controllable path of said second transistor and said first resistor; and a first terminal and a second terminal; said first and second controllable paths and said first resistor being connected between said first and second terminals.

2. The circuit arrangement of claim 1, comprising a second current source connected to said first line node and said second line node; said second current source compensating a current generated by said first current source in a current path between said first terminal and said second terminal.

3. The circuit arrangement of claim 2, wherein said second current source comprises a second control voltage terminal and a third resistor.

4. The circuit arrangement of claim 2, wherein said second current source is switchable.

5. The circuit arrangement of claim 1, wherein said first current source comprises a first control voltage terminal and a second resistor.

6. The circuit arrangement of claim 1, wherein said first an second zener diodes are connected in such a way that a constant control voltage is present at said first and second control terminals if no current flows between said first terminal and said second terminal.

7. The circuit arrangement of claim 1, wherein said first current source is switchable.

8. The circuit arrangement of claim 1, wherein said first and second zener diodes have each a breakdown voltage, said first resistor has a resistance and said first and second transistors have each a threshold voltage; said breakdown voltages, said resistance and said threshold voltages being chosen in such a way that when the current flowing through a current path between said first terminal and second terminal increases, starting from a limiting current value, one of said first or second controllable paths effects blocking.

9. The circuit arrangement of claim 1, comprising a first capacitor connected in parallel between said first control terminal and said first controllable path.

10. The circuit arrangement of claim 1, comprising a second capacitor connected in parallel between said second control terminal and said second controllable path.

11. The circuit arrangement of claim 1, comprising a first noise suppression resistor connected between said first control terminal of said first transistor and said first current source.

12. The circuit arrangement of claim 1, comprising a second noise suppression resistor connected between said second control terminal of said second transistor and said first current source.

13. The circuit arrangement of claim 1, comprising a turn-off resistor connected between said first current source and at least one of said first and second line nodes.

14. The circuit arrangement of claim 1, comprising a first regulating transistor having a third controllable path and a third control terminal; said third controllable path of said first regulating transistor being connected between said first control terminal of said first transistor and said second line node and said third control terminal of said first regulating transistor being connected to said first line node.

15. The circuit arrangement of claim 14, comprising a second regulating transistor having a fourth controllable path and a fourth control terminal; said fourth controllable path of said second regulating transistor being connected between said second control terminal of said second transistor and said first line node and said second control terminal of said second regulating transistor being connected to said second line node.

16. The circuit arrangement of claim 1, wherein at least one of said first and second transistors is a MOSFET.

17. The circuit arrangement of claim 16, wherein at least one of said first and second transistors is an N-channel transistor.

18. The circuit arrangement of claim 1, being connected into a line loop for limiting a ringing current.

19. The circuit arrangement of claim 1, wherein said first terminal is coupled to a load and said second terminal is coupled to a supply voltage potential; said load being coupled to a ringing signal generator via a fourth resistor.

20. The circuit arrangement of claim 19, wherein said load comprises a splitter device.

* * * * *